Patented Jan. 27, 1931

1,790,096

UNITED STATES PATENT OFFICE

HEINRICH JENSCH, OF HOCHST-ON-THE-MAIN, GERMANY, ASSIGNOR TO WINTHROP CHEMICAL COMPANY INC., OF NEW YORK, N. Y., A CORPORATION

TERTIARY AMINES CONTAINING THE 1-AMINO-2-HYDROXYPROPYL RESIDUE

No Drawing. Application filed July 23, 1927, Serial No. 208,060, and in Germany August 13, 1926.

My present invention relates to tertiary amines containing the 1-amino-2-hydroxypropyl residue and to a process of preparing the same.

I have found that the hitherto unknown tertiary amines of the general formula

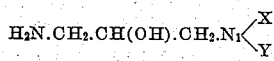

wherein $N_1$ represents nitrogen of a tertiary amine, and X and Y stand for alkyl, aryl or carbon atoms belonging to a heterocyclic nitrogen containing nucleus, can be prepared by causing secondary amines to act upon 3-halogen-2-hydroxypropylamine salts (see "Berichte der Deutschen Chemischen Gesellschaft," volume 50, page 822). Instead of using the 3-halogen-2-hydroxypropylamine salts obtained by saponification of 3-halogen-2-hydroxypropylphthalimide it is also possible to cause the secondary amines to act upon 3-halogen 2-hydroxypropylphthalimide (see "Berichte," volume 50, pages 820, 821 and 825) and then split off the phthalic acid residue. The new tertiary amines are separted by means of an alkali and purified by distillation. They are of therapeutical value and have a blood-sugar reducing action, being at the same time useful as intermediate products for the manufacture of other medicines.

The following examples serve to illustrate my invention, but they are not intended to limit it thereto:—

1. 80 g. of 3-chloro-2-hydroxypropylphthalimide in a solution of 50 g. of diethylamine in 200 ccm. of alcohol are heated to boiling in a reflux apparatus for several hours. After having distilled off the alcohol, the residue is boiled for about three hours with hydrochloric acid of 20 per cent. strength; after cooling, the phthalic acid which has separated is filtered off, the filtrate is concentrated and the α-amino-β-hydroxy-γ-diethylaminopropane is separated as an oil by the addition of strong caustic potash solution. This oil is separated from the aqueous layer and distilled in a vacuum. It is thus obtained as a colorless oil of a slightly basic smell boiling at 114° C. to 115° C. under 20 mm. pressure. Its hydrochloride is extremely hygroscopic. It corresponds probably to the formula:

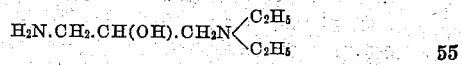

2. 29 g. of the hydrochloride of 3-chloro-2-hydroxypropylamine are heated to boiling for several hours with 34 g. of diethylamine and 100 ccm. of alcohol. After having distilled off the alcohol, there is added to the residue a strong caustic potash solution; the whole is then heated for some time in order to expel the diethylamine, the remaining oil is separated and distilled in vacuo. Thus the 3-diethylamino-2-hydroxypropylamine is obtained having the properties described in Example 1.

3. 130 g. of 3-chloro-2-hydroxypropylphthalimide are heated in a steam bomb for 4 hours with 175 g. of an alcoholic dimethylamine solution of 30 per cent strength. The contents of the bomb is then concentrated by evaporating, the remaining sirupy mass is boiled for 4 hours with 750 ccm. of hydrochloric acid of 20 per cent. strength; after cooling, the solution is separated from the phthalic acid and evaporated in a vacuum until it is thick like sirup. This sirupy mass is mixed first with concentrated caustic soda solution and then with potassium carbonate until a thick magma is obtained which is repeatedly digested with benzene. After having dried these extracts by means of potassium carbonate, they are freed from the benzene and the residue is distilled in a vacuum. The new base boils under 28 mm. pressure at 103° C. It is a colorless oil of a basic smell and yields a solid hydrochloride which is, however, extremely hygroscopic. It has the probable formula:

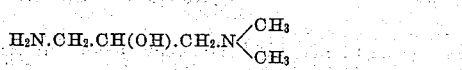

4. 80 g. of 3-chloro-2-hydroxypropylphthalimide and 60 g. of piperidine in 200 ccm. of alcohol are treated as indicated in Example 1. The product is also worked up in the manner described in that example. After distillation in vacuo an oil of a basic smell is obtained boiling under 29 mm. pressure at 148° C. to 150° C. When allowed to stand for some time this oil solidifies into a colorless crystalline mass. By acidifying the etherial solution of the base with alcoholic hydrochloric acid, the colorless dihydrochloride is obtained as a viscous mass which gradually solidifies and melts after recrystallization from absolute alcohol at 181° C. It is very easily soluble in water. The product obtainable according to this example has the probable formula:

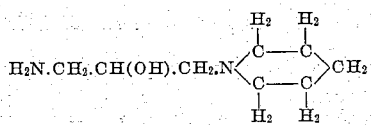

5. 80 g. of 3-chloro-2-hydroxyproyl-phthalimide are treated as above indicated with 71 g. of monomethylaniline. After having split off the phthaloyl residue, filtered the phthalic acid and evaporated the filtrate, the remaining mass is neutralized with concentrated caustic soda solution; there is then added thereto a saturated potassium carbonate solution and the base is shaken out with chloroform. The residue of the chloroform solution is fractionated in a vacuum. The base is thus obtained in the form of a slightly yellow oil which distils over under 30 mm. pressure at between 205° C. and 210° C. and solidifies into a colorless mass. It is readily soluble in chloroform, less soluble in benzene and difficultly soluble in cold ether. When recrystallized from ether it melts at 71° C. It gives a colorless hydrochloride which is very readily soluble in water and melts on recrystallization from absolute alcohol at 201° C. while foaming. It has the probable formula:

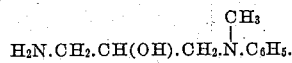

I claim:

1. As a new product, 1-amino-3-dimethyl-amino-2-propanol of the formula:

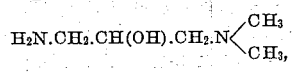

being a colorless oily base which forms readily water-soluble salts and boiling under 28 mm. pressure at 103° C.

2. The process which comprises causing a secondary amine to act upon a compound of the general formula

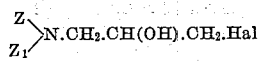

wherein Hal represents a halogen atom, Z and $Z_1$ stand for hydrogen or jointly for the phthalic acid residue

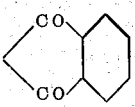

3. The process which comprises causing a secondary amine to act upon 3-halogen-2-hydroxypropyl-phthalimide of the formula

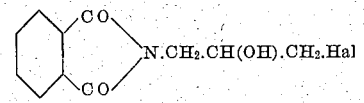

wherein Hal represents a halogen atom.

4. The process which comprises causing a secondary amine to act upon 3-halogen-2-hydroxypropyl-phthalimide of the formula

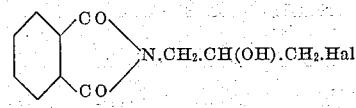

wherein Hal represents a halogen atom, and splitting off the phthalic acid residue.

5. As new products the compounds of the general formula

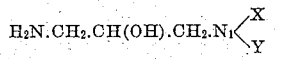

wherein $N_1$ represents nitrogen of a tertiary amine, and X and Y stand for alkyl, aryl or carbon atoms belonging to a heterocyclic nitrogen containing nucleus, the said compounds being substances of a high basicity which form with acids readily soluble salts and which are distinguished by a blood-sugar reducing action.

6. As new products the compounds of the general formula

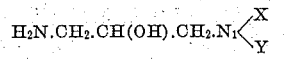

wherein $N_1$ represents nitrogen of a tertiary amine, X stands for an alkyl-group and Y stands for an alkyl- or phenyl-group, the said compounds being substances of a high basicity which form with acids readily soluble salts and which are distinguished by a blood-sugar reducing action.

7. As new products the compounds of the general formula

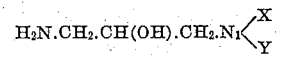

wherein $N_1$ represents nitrogen of a tertiary amine, and X and Y stand for an alkyl-group, the said compounds being substances of a high basicity which form with acids readily soluble salts and which are distinguished by a blood-sugar reducing action.

In testimony whereof, I affix my signature.

HEINRICH JENSCH.